US012283250B2

(12) United States Patent
Pyun et al.

(10) Patent No.: US 12,283,250 B2
(45) Date of Patent: Apr. 22, 2025

(54) DISPLAY DEVICE AND METHOD OF DRIVING THE SAME

(71) Applicant: Samsung Display Co., Ltd., Yongin-si (KR)

(72) Inventors: Kihyun Pyun, Gwangmyeong-si (KR); Jungeon An, Asan-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 199 days.

(21) Appl. No.: 18/130,671

(22) Filed: Apr. 4, 2023

(65) Prior Publication Data

US 2023/0402015 A1 Dec. 14, 2023

(30) Foreign Application Priority Data

Jun. 9, 2022 (KR) ........................ 10-2022-0070126

(51) Int. Cl.
*G09G 3/3275* (2016.01)
*G09G 3/3266* (2016.01)

(52) U.S. Cl.
CPC ......... *G09G 3/3275* (2013.01); *G09G 3/3266* (2013.01); *G09G 2310/027* (2013.01); *G09G 2320/0247* (2013.01); *G09G 2320/0271* (2013.01); *G09G 2330/021* (2013.01); *G09G 2330/028* (2013.01)

(58) Field of Classification Search
CPC ............... G09G 3/3275; G09G 3/3266; G09G 2310/027; G09G 2320/0247; G09G 2320/0271; G09G 2330/021; G09G 2330/028
USPC .......................................................... 345/204
See application file for complete search history.

(56) References Cited

U.S. PATENT DOCUMENTS

2016/0307490 A1* 10/2016 Lee ...................... G09G 3/3225

FOREIGN PATENT DOCUMENTS

KR 100495792 B1 9/2005
KR 100720084 B1 12/2007
KR 2014137811 A * 12/2014
KR 101817597 B1 1/2018

(Continued)

*Primary Examiner* — Mark Edwards

(74) *Attorney, Agent, or Firm* — CANTOR COLBURN LLP

(57) ABSTRACT

A display device includes pixels which displays an image based on image data, a driving voltage generator which provides a driving voltage to each of the pixels, and a driving voltage controller which calculates block pixel numbers corresponding to first to $n^{th}$ grayscale blocks based on the image data, calculates maximum grayscales with respect to the first to $n^{th}$ grayscale blocks based on the image data, determines a maximum grayscale block among the first to $n^{th}$ grayscale blocks by comparing the block pixel numbers to minimum pixel numbers corresponding to the first to $n^{th}$ grayscale blocks, determines a maximum grayscale with respect to the maximum grayscale block based on the maximum grayscales, calculates a load of the image data, calculates a voltage drop amount of the driving voltage based on the load, and calculates a magnitude of the driving voltage based on the maximum grayscale and the voltage drop amount.

20 Claims, 9 Drawing Sheets

(56) References Cited

FOREIGN PATENT DOCUMENTS

| | | | |
|---|---|---|---|
| KR | 102102697 | B1 | 4/2020 |
| KR | 1020210027597 | A | 3/2021 |

* cited by examiner

DISPLAY DEVICE AND METHOD OF DRIVING THE SAME

This application claims priority to Korean Patent Application No. 10-2022-0070126, filed on Jun. 9, 2022, and all the benefits accruing therefrom under 35 U.S.C. § 119, the content of which in its entirety is herein incorporated by reference.

BACKGROUND

1. Field

Embodiments relate to a display device. More particularly, embodiments relate to a display device applied to various electronic apparatuses and a method of driving the display device.

2. Description of the Related Art

A display device may include a plurality of pixels. The display device may display an image using lights emitted from the pixels.

A driving voltage may be provided to the pixels to display an image, and the pixels may emit light with luminances corresponding to driving currents flowing through the pixels. in such a display device, the driving currents flowing through the pixels and/or the driving voltage provided to the pixels may be desired to decrease to reduce power consumption.

SUMMARY

When a magnitude of a driving voltage provided to pixels of a display device changes, the luminance of an image displayed by the display device may change. Flicker may occur when the luminance of the image changes, and image quality of the display device may be degraded when the flicker is recognized.

Embodiments provide a display device for preventing an increase in luminance of an image and reducing power consumption, and a method of driving the display device.

A display device according to embodiments includes a plurality of pixels which displays an image based on image data, a driving voltage generator which provides a driving voltage to each of the pixels, and a driving voltage controller which calculates block pixel numbers corresponding to first to $n^{th}$ grayscale blocks defined by dividing an entire grayscale range based on the image data, calculates maximum grayscales with respect to the first to $n^{th}$ grayscale blocks based on the image data, determines a maximum grayscale block among the first to $n^{th}$ grayscale blocks by comparing the block pixel numbers to minimum pixel numbers corresponding to the first to $n^{th}$ grayscale blocks, determines a maximum grayscale with respect to the maximum grayscale block based on the maximum grayscales, calculates a load of the image data, calculating a voltage drop amount of the driving voltage based on the load, and calculates a magnitude of the driving voltage based on the maximum grayscale and the voltage drop amount, where n is a natural number greater than or equal to 2.

In an embodiment, grayscale range widths of the first to $n^{th}$ grayscale blocks may be equal to each other.

In an embodiment, the entire grayscale range may be from 0 grayscale to 255 grayscale. In such an embodiment, the first grayscale block may include the 0 grayscale, and the $n^{th}$ grayscale block may include the 255 grayscale.

In an embodiment, a grayscale range width of each of the first to $n^{th}$ grayscale blocks may be 8 grayscale levels.

In an embodiment, the minimum pixel numbers corresponding to the first to $n^{th}$ grayscale blocks may be equal to each other.

In an embodiment, the minimum pixel numbers corresponding to the first to $n^{th}$ grayscale blocks may decrease from the first grayscale block to the $n^{th}$ grayscale block.

In an embodiment, the driving voltage controller may calculate the magnitude of the driving voltage to be larger as the maximum grayscale or the voltage drop amount increases.

In an embodiment, the driving voltage controller may include a grayscale block generator which calculates the block pixel numbers corresponding to the first to $n^{th}$ grayscale blocks and the maximum grayscales with respect to the first to $n^{th}$ grayscale blocks based on the image data, a maximum grayscale block determiner which determines the maximum grayscale block among the first to $n^{th}$ grayscale blocks by comparing the block pixel numbers to the minimum pixel numbers corresponding to the first to $n^{th}$ grayscale blocks, a maximum grayscale determiner which determines the maximum grayscale with respect to the maximum grayscale block based on the maximum grayscales, a load calculator which calculates the load of the image data, a voltage drop amount calculator which calculates the voltage drop amount of the driving voltage based on the load, and a driving voltage calculator which calculates the magnitude of the driving voltage based on the maximum grayscale and the voltage drop amount.

In an embodiment, the maximum grayscale block determiner may select target grayscale blocks, in each of which a block pixel number corresponding thereto is greater than a minimum pixel number corresponding thereto, among the first to $n^{th}$ grayscale blocks, and may determine a target grayscale block including a greatest grayscale among the target grayscale blocks as the maximum grayscale block.

In an embodiment, the driving voltage controller may generate a driving voltage code based on the magnitude of the driving voltage. The driving voltage generator may generate the driving voltage based on the driving voltage code.

In an embodiment, the display device may further include a gate driver which provides a gate signal to each of the pixels, and a data driver which provides a data signal to each of the pixels.

In an embodiment, each of the pixels may include a first transistor which generates a driving current based on the driving voltage and the data signal, a second transistor which provides the data signal to the first transistor in response to the gate signal, and a light emitting element which emits light based on the driving current.

A method of driving a display device including a plurality of pixels which displays an image based on image data according to embodiments includes calculating block pixel numbers corresponding to first to $n^{th}$ grayscale blocks defined by dividing an entire grayscale range based on the image data, where n is a natural number greater than or equal to 2, calculating maximum grayscales with respect to the first to $n^{th}$ grayscale blocks based on the image data, determining a maximum grayscale block among the first to $n^{th}$ grayscale blocks by comparing the block pixel numbers to minimum pixel numbers corresponding to the first to $n^{th}$ grayscale blocks, determining a maximum grayscale with respect to the maximum grayscale block based on the maximum grayscales, calculating a load of the image data, calculating a voltage drop amount of a driving voltage, which is provided to the pixels, based on the load, and calculating a magnitude of the driving voltage based on the maximum grayscale and the voltage drop amount.

In an embodiment, the determining the maximum grayscale block may include selecting target grayscale blocks, in each of which a block pixel number corresponding thereto is greater than a minimum pixel number corresponding thereto, among the first to $n^{th}$ grayscale blocks, and determining a target grayscale block including a greatest grayscale among the target grayscale blocks as the maximum grayscale block.

In an embodiment, the method may further include generating a driving voltage code based on the magnitude of the driving voltage, and generating the driving voltage based on the driving voltage code.

In an embodiment, grayscale range widths of the first to $n^{th}$ grayscale blocks may be equal to each other.

In an embodiment, the entire grayscale range may be from 0 grayscale to 255 grayscale. In such an embodiment, the first grayscale block may include the 0 grayscale, and the $n^{th}$ grayscale block may include the 255 grayscale.

In an embodiment, a grayscale range width of each of the first to $n^{th}$ grayscale blocks may be 8 grayscale levels.

In an embodiment, the minimum pixel numbers corresponding to the first to $n^{th}$ grayscale blocks may be equal to each other.

In an embodiment, the minimum pixel numbers corresponding to the first to $n^{th}$ grayscale blocks may decrease from the first grayscale block to the $n^{th}$ grayscale block.

In the display device and the method of driving the display device according to embodiments, the maximum grayscale block may be determined among the grayscale blocks by comparing the block pixel numbers corresponding the grayscale blocks to the minimum pixel numbers corresponding to the grayscale blocks, and the driving voltage may be calculated based on the maximum grayscale with respect to the maximum grayscale block, so that the driving voltage may not increase when a high grayscale is applied to pixels less than the minimum pixel number. Accordingly, in such embodiments, an increase in luminance of an image of the display device may be effectively prevented, and power consumption of the display device may be reduced.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
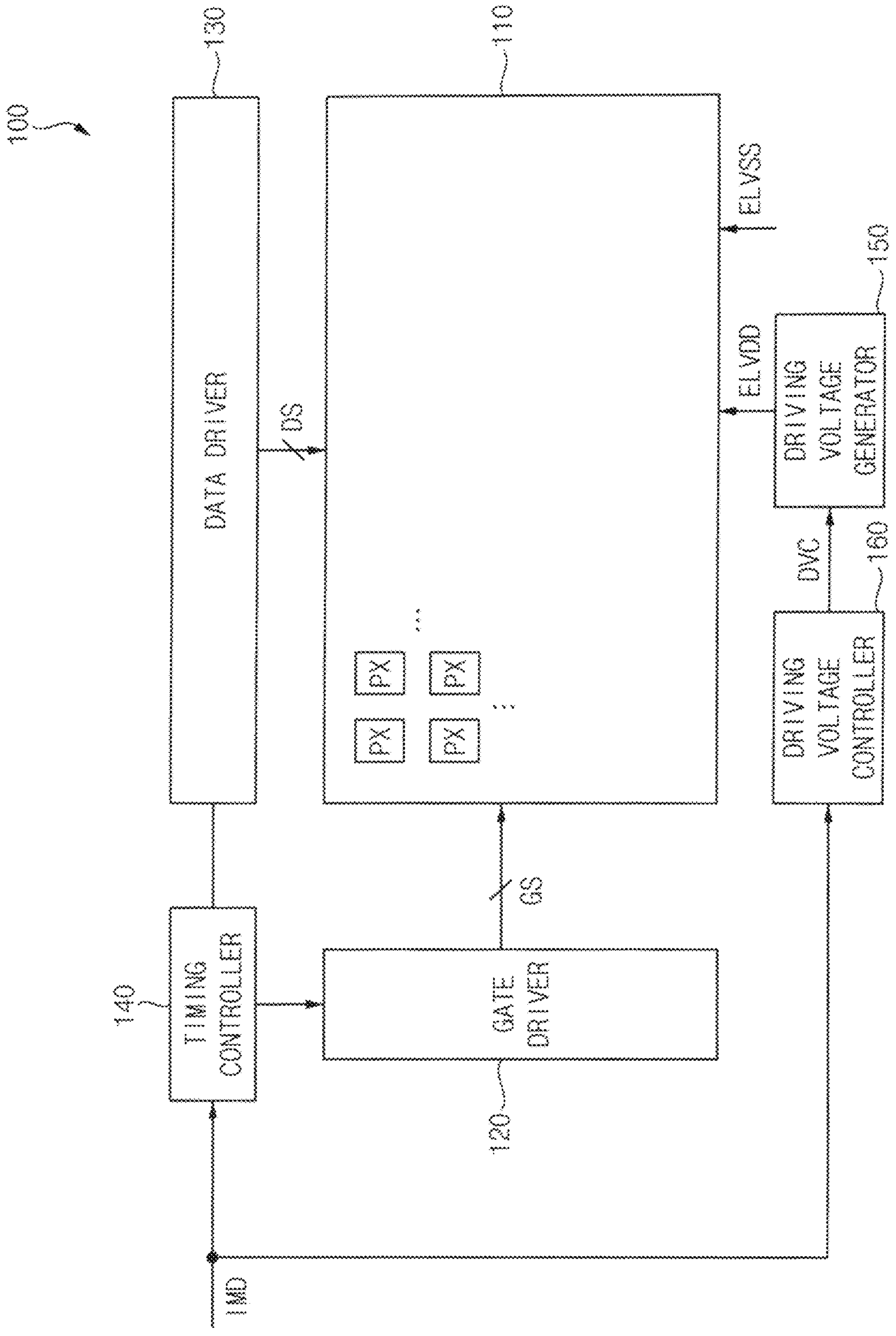
FIG. 1 is a block diagram illustrating a display device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a display device and a method of driving a display device according to embodiments of the disclosure will be described in detail with reference to the accompanying drawings.

Figure 2:
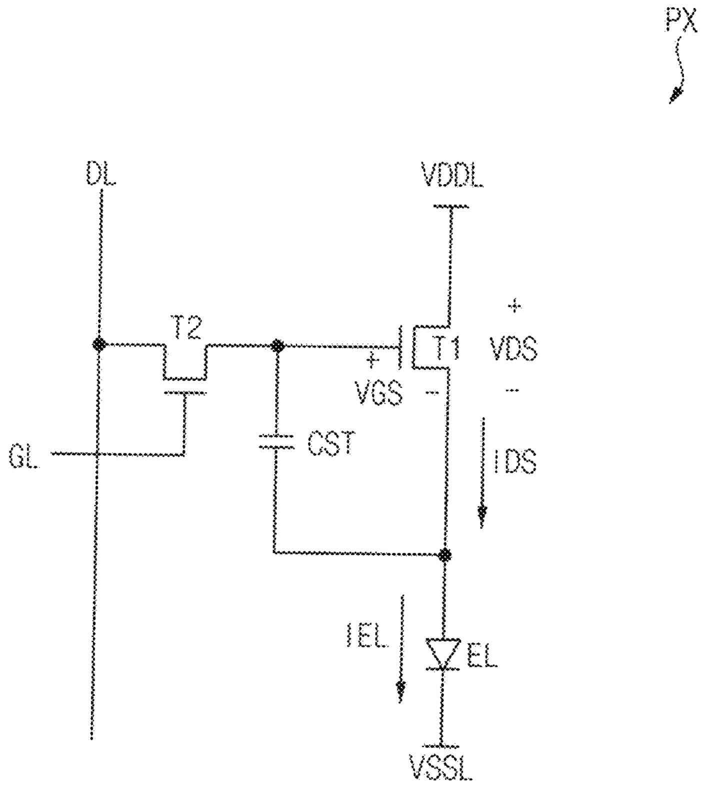
FIG. 2 is a circuit diagram illustrating an embodiment of a pixel included in the display device in FIG. 1.
Figure 3:
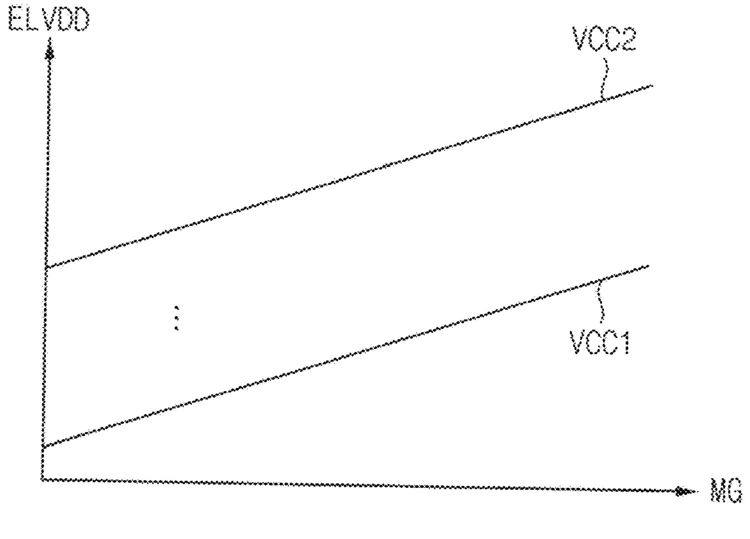
FIG. 3 is a diagram for describing an operation of a driving voltage controller included in the display device in FIG. 1.

FIG. 1 is a block diagram illustrating a display device 100 according to an embodiment. FIG. 2 is a circuit diagram illustrating an embodiment of a pixel PX included in the display device 100 in FIG. 1. FIG. 3 is a diagram for describing an operation of a driving voltage controller 160 included in the display device 100 in FIG. 1.

Referring to FIGS. 1, 2, and 3, an embodiment of the display device 100 may include a display panel 110, a gate driver 120, a data driver 130, a timing controller 140, a driving voltage generator 150, and a driving voltage controller 160.

The display panel 110 may include various display elements such as organic light emitting diode ("OLED") or the like. Hereinafter, embodiments where the display panel 110 includes the organic light emitting diode as a display element will be described for convenience. However, the disclosure is not limited thereto, and the display panel 110 may include various display elements such as a liquid crystal display ("LCD") element, an electrophoretic display ("EPD") element, an inorganic light emitting diode, a quantum dot light emitting diode, or the like.

The display panel 110 may include a plurality of pixels PX. The pixels PX may display an image based on image data 1 MB. Each of the pixels PX may be electrically connected to a data line DL and a gate line GL. Further, each of the pixels PX may be electrically connected to a driving voltage line VDDL and a common voltage line VSSL, and may receive a driving voltage ELVDD and a common voltage ELVSS respectively from the driving voltage line VDDL and the common voltage line VSSL. Each of the pixels PX may emit light with a luminance corresponding to a data signal DS provided through the data line DL in response to a gate signal GS provided through the gate line GL.

Referring to FIG. 2, in an embodiment, the pixel PX may include a first transistor T1, a second transistor T2, a storage capacitor CST, and a light emitting element EL.

The first transistor T1 may generate a driving current IEL based on the driving voltage ELVDD and the data signal DS, and may provide the driving current IEL to the light emitting element EL. A first electrode of the first transistor T1 may be connected to the driving voltage line VDDL, and a second electrode of the first transistor T1 may be connected to a first electrode of the light emitting element EL. A gate electrode of the first transistor T1 may be connected to a second electrode of the second transistor T2.

The second transistor T2 may provide the data signal DS to the first transistor T1 in response to the gate signal GS. A first electrode of the second transistor T2 may be connected to the data line DL, and the second electrode of the second transistor T2 may be connected to the gate electrode of the first transistor T1. A gate electrode of the second transistor T2 may be connected to the gate line GL.

FIG. 2 illustrates an embodiment in which each of the first transistor T1 and the second transistor T2 is an N-type transistor, but the disclosure is not limited thereto. In an alternative embodiment, at least one selected from the first transistor T1 and the second transistor T2 may be a P-type transistor.

The storage capacitor CST may store the data signal DS. A first electrode of the storage capacitor CST may be connected to the second electrode of the first transistor T1, and a second electrode of the storage capacitor CST may be connected to the gate electrode of the first transistor T1.

FIG. 2 illustrates an embodiment in which the pixel PX includes two transistors T1 and T2 and a single capacitor CST, but the disclosure is not limited thereto. In an alternative embodiment, the pixel PX may include three or more transistors and/or two or more capacitors.

The light emitting element EL may emit light based on the driving current IEL. The first electrode of the light emitting element EL may be connected to the second electrode of the first transistor T1, and a second electrode of the light emitting element EL may be connected to the common voltage line VSSL.

When the first transistor T1 operates in a saturation region, a voltage VDS between the first electrode and the second electrode of the first transistor T1 may be proportional to a current IDS flowing through the first transistor T1. The voltage VDS between the first electrode and the second electrode of the first transistor T1 may be equal to a difference between the driving voltage ELVDD and a voltage of the first electrode of the light emitting element EL, and the current IDS flowing through the first transistor T1 may be equal to the driving current IEL. Accordingly, although a voltage VGS between the gate electrode and the second electrode of the first transistor T1 maintains, the luminance of the pixel PX may increase as the driving current IEL increases when the driving voltage ELVDD increases, and the luminance of the pixel PX may decrease as the driving current IEL decreases when the driving voltage ELVDD decreases.

The gate driver 120 may generate the gate signals GS based on a gate control signal, and may provide the gate signals GS to the pixels PX. The gate control signal may include a gate start signal, a gate clock signal, or the like. The gate driver 120 may sequentially generate the gate signals GS corresponding to the gate start signal based on the gate clock signal.

The data driver 130 may generate the data signals DS based on the image data IMD and a data control signal, and may provide the data signals DS to the pixels PX. The image data IMD may include grayscale values respectively corresponding to the pixels PX. The data control signal may include a data start signal, a data clock signal, or the like.

The timing controller 140 may control a driving of the gate driver 120 and a driving of the data driver 130. The timing controller 140 may generate the gate control signal and the data control signal based on the image data and a control signal. The control signal may include a vertical synchronization signal, a horizontal synchronization signal, a clock signal, a data enable signal, or the like.

The driving voltage generator 150 may generate the driving voltage ELVDD based on a driving voltage code DVC. The driving voltage generator 150 may provide the driving voltage ELVDD to the pixels PX.

The driving voltage controller 160 may calculate block pixel numbers corresponding to first to $n^{th}$ grayscale blocks (n is a natural number greater than or equal to 2) that divides (or is defined by dividing) an entire grayscale range based on the image data IMD, and may calculate maximum grayscales with respect to the first to $n^{th}$ grayscale blocks based on the image data IMD. The driving voltage controller 160 may determine a maximum grayscale block among the first to $n^{th}$ grayscale blocks by comparing the block pixel numbers to minimum pixel numbers corresponding to the first to $n^{th}$ grayscale blocks, respectively, and may determine a maximum grayscale MG with respect to the maximum grayscale block based on the maximum grayscales. The driving voltage controller 160 may calculate a load of the image data IMD, and may calculate a voltage drop amount of the driving voltage ELVDD based on the load. The driving voltage controller 160 may calculate a magnitude of the driving voltage ELVDD based on the maximum grayscale MG and the voltage drop amount, and may generate the driving voltage code DVC based on the magnitude of the driving voltage ELVDD.

Referring to FIG. 3, the driving voltage controller 160 may calculate the magnitude of the driving voltage ELVDD based on first to second voltage control curves VCC1, . . . , VCC2 indicating a relationship between the maximum grayscale MG and the driving voltage ELVDD. The first voltage control curve VCC1 may illustrate the driving voltage ELVDD with respect to the maximum grayscale MG when the voltage drop amount of the driving voltage ELVDD is a minimum value (when the load of the image data IMD is a minimum load), and the second voltage control curve VCC2 may illustrate the driving voltage ELVDD with respect to the maximum grayscale MG when the voltage drop amount of the driving voltage ELVDD is a maximum value (when the load of the image data IMD is a maximum load). Each of voltage control curves between the first voltage control curve VCC1 and the second voltage control curve VCC2 may illustrate the driving voltage ELVDD with respect to the maximum grayscale MG when the voltage drop amount of the driving voltage ELVDD is greater than the minimum value and less than the maximum value (when the load of the image data IMD is greater than the minimum load and less than the maximum load).

The driving voltage controller 160 may calculate the magnitude of the driving voltage ELVDD to be larger (or to increase) as the maximum grayscale MG increases. Since a luminance of light emitted from the light emitting element EL included in the pixel PX increases as the maximum grayscale MG increases, the magnitude of the driving voltage ELVDD may be calculated to be larger as the maximum grayscale MG increases.

The driving voltage controller 160 may calculate the magnitude of the driving voltage ELVDD to be larger as the voltage drop amount increases. Since the magnitude of the driving voltage ELVDD applied to the pixel PX decreases as the voltage drop amount of the driving voltage ELVDD increases, the magnitude of the driving voltage ELVDD may be calculated to be larger to compensate a voltage drop of the driving voltage ELVDD.

Figure 4:
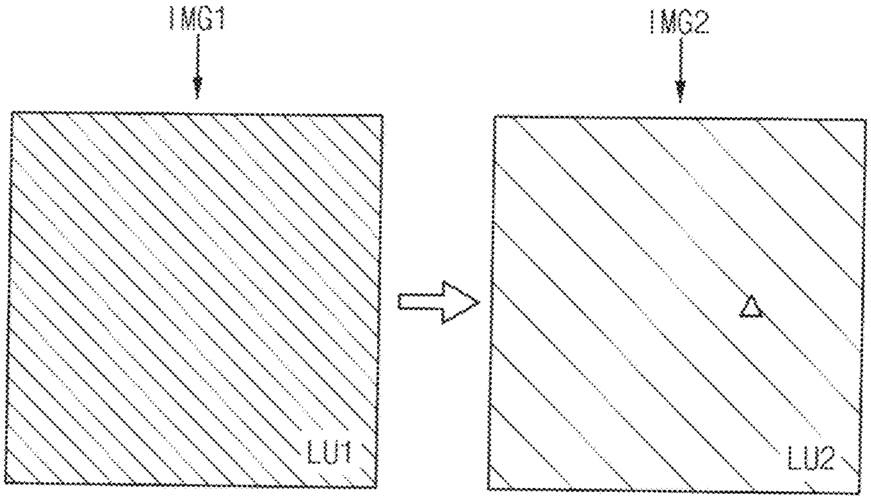
FIGS. 4, 5, and 6 are diagrams for describing a change in image according to a comparative example.
Figure 5:
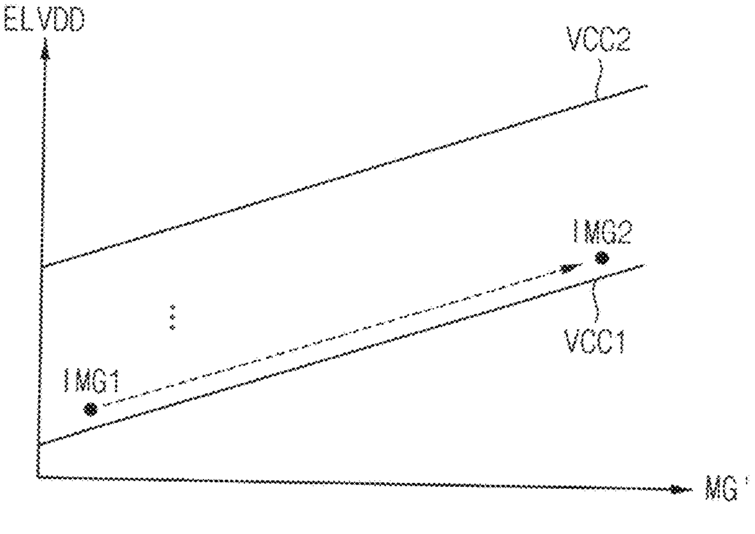
Figure 6:
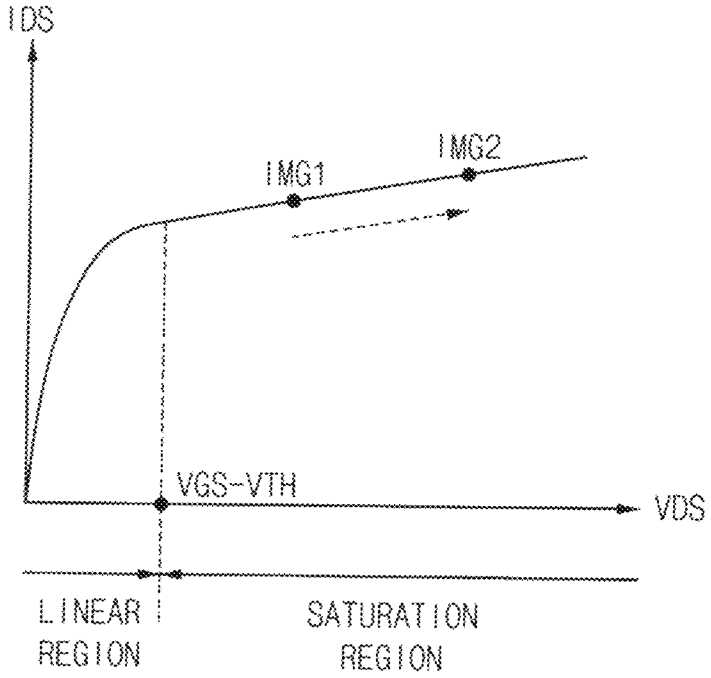

FIGS. 4, 5, and 6 are diagrams for describing a change in image according to a comparative example.

Referring to FIGS. 4, 5, and 6, in a comparative example, a driving voltage controller may calculate the magnitude of the driving voltage ELVDD from the first to second voltage control curves VCC1, . . . , VCC2 based on a maximum grayscale MG' of the image data IMD and the voltage drop amount of the driving voltage ELVDD. The maximum grayscale MG' may be a maximum grayscale value among grayscale values of the image data IMD corresponding to the pixels PX. When a first image IMG1 is displayed in a first frame period and a second image IMG2 is displayed in a second frame period after the first frame period, a driving voltage controller may calculate the magnitude of the driving voltage ELVDD in the first and second frame periods from the first to second voltage control curves VCC1, . . . , VCC2 based on the maximum grayscale MG' of the image data IMD corresponding to the first and second images IMG1 and IMG2 and the voltage drop amount of the driving voltage ELVDD. In such an example, as shown in FIG. 4, the first image IMG1 may be an image in which 24,883,200 pixels PX display 30 grayscale or a grayscale values (level) of 30 (a dark background image), and the second image IMG2 may be an image in which 24,880,500 pixels PX display 30 grayscale and 2,700 pixels PX display 255 grayscale or a grayscale values (level) of 255 (an image in which a small triangle is displayed on a dark background).

The voltage drop amount of the driving voltage may be relatively small since the load of the image data IMD corresponding to the first and second images IMG1 and IMG2 is relatively small, and accordingly, the magnitude of the driving voltage ELVDD may be calculated based on a voltage control curve adjacent to the first voltage control curve VCC1 among the first to second voltage control curves VCC1, . . . , VCC2. Further, since the maximum grayscale MG' of the image data IMD corresponding to the first image IMG1 is 30 grayscale and the maximum grayscale MG' of the image data IMD corresponding to the second image IMG2 is 255 grayscale, the magnitude of the driving voltage ELVDD calculated in the second frame period for displaying the second image IMG2 may be greater than the magnitude of the driving voltage ELVDD calculated in the first frame period for displaying the first image IMG1. In this case, since the driving voltages ELVDD provided to the pixel PX in the first and second frame periods are different from each other although the data signals DS provided to the pixel PX are substantially the same as each other in the first and second frame periods, a second luminance LU2 of the background of the second image IMG2 may be higher than a first luminance LU1 of the background of the first image IMG1.

Specifically, a voltage VDS between the first electrode and the second electrode of the first transistor T1 may increase as the magnitude of the driving voltage ELVDD increases in the first and second frame periods, and a current IDS flowing through the first transistor T1 may increase due to channel length modulation characteristics when the voltage VDS between the first electrode and the second electrode of the first transistor T1 increases although the voltages VGS between the gate electrode and the second electrode of the first transistor T1 are the same as each other. As the current IDS flowing through the first transistor T1 increases, the first luminance LU1 of the background of the first image IMG1 may increase to the second luminance LU2 of the background of the second image IMG2. An increase in background luminance (LU1→LU2) due to the change in image (IMG1→IMG2) may be recognized as a flicker, and accordingly, image quality of the display device 100 may be degraded. Further, power consumption of the display device 100 may increase according to the increase in background luminance (LU1→LU2) due to the change in image (IMG1→IMG2).

Figure 7:
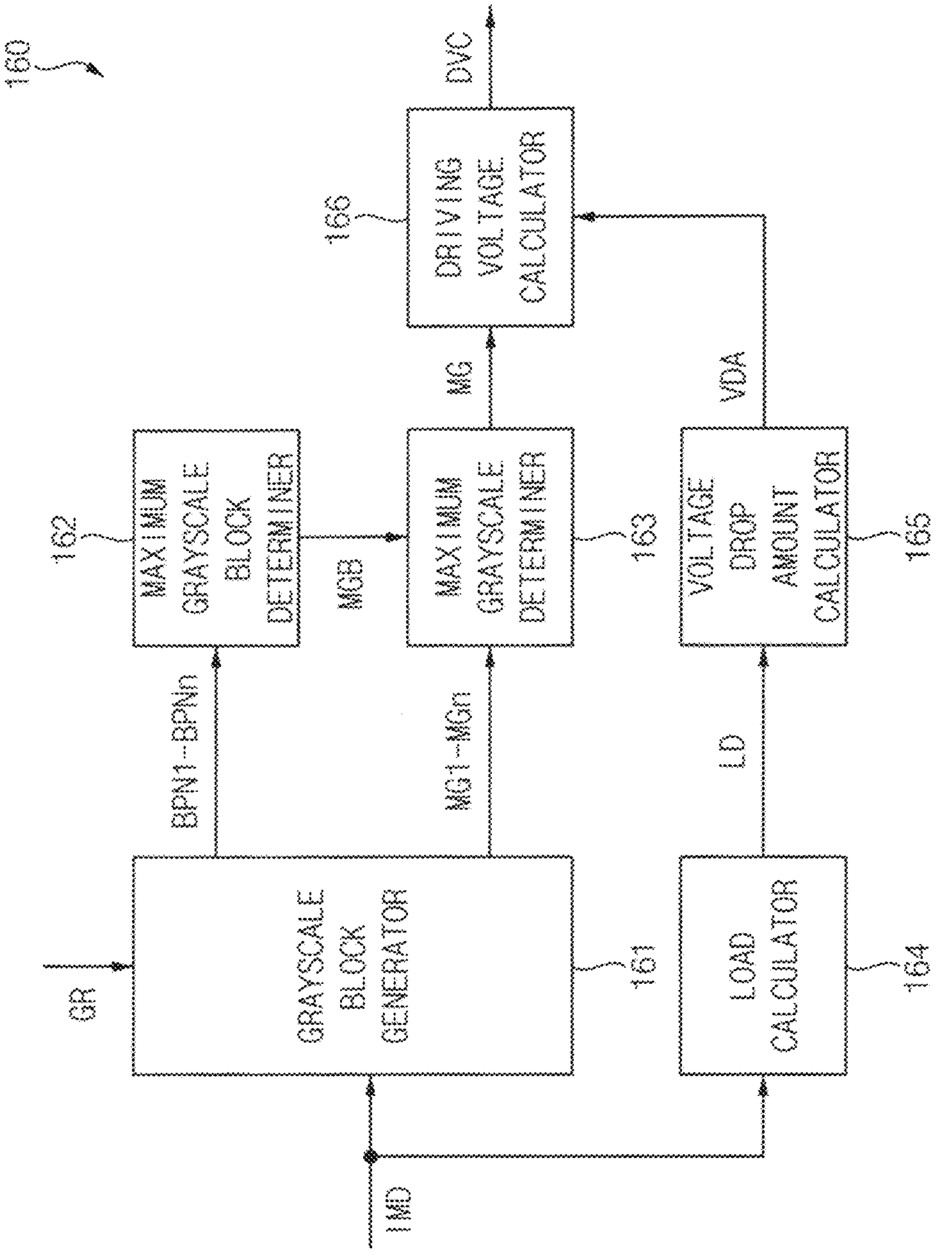
FIG. 7 is a block diagram illustrating an embodiment of a driving voltage controller included in the display device in FIG. 1.
Figure 8:
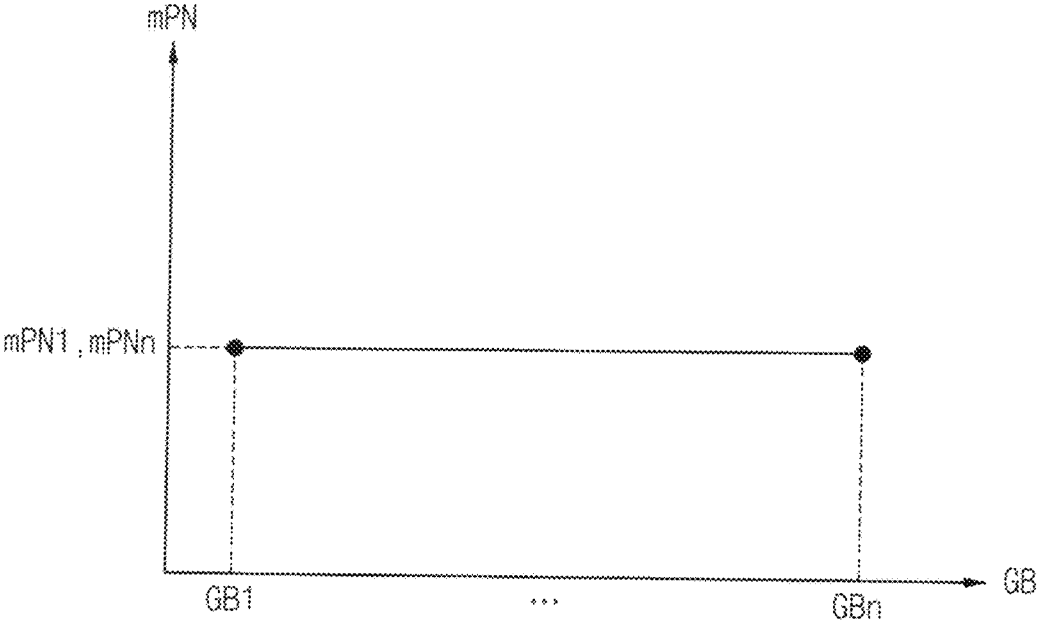
FIG. 8 is a diagram illustrating minimum pixel numbers corresponding to grayscale blocks according to an embodiment.
Figure 9:
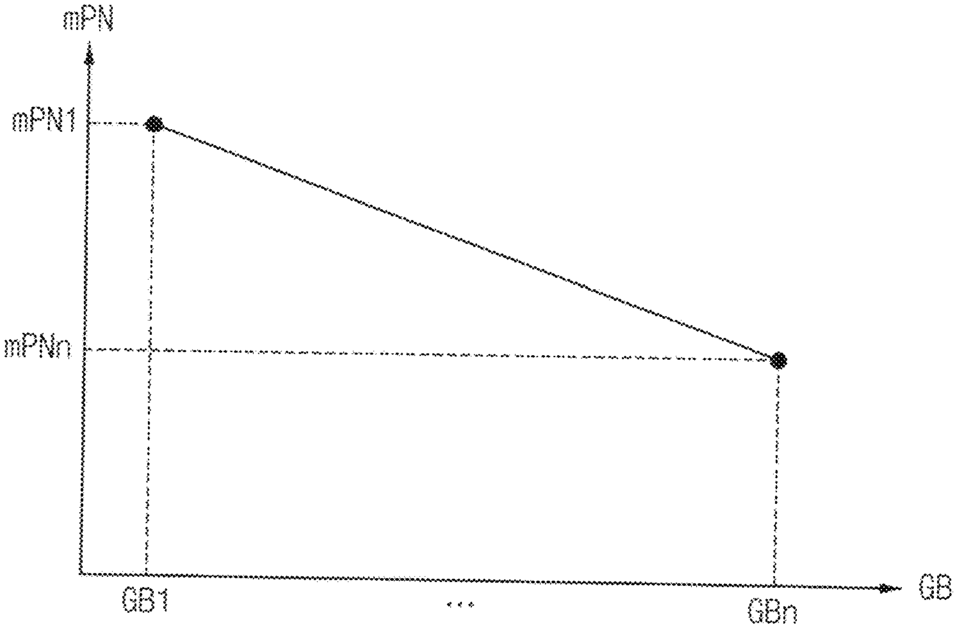
FIG. 9 is a diagram illustrating minimum pixel numbers corresponding to grayscale blocks according to an alternative embodiment.

FIG. 7 is a block diagram illustrating an embodiment of the driving voltage controller 160 included in the display device 100 in FIG. 1. FIG. 8 is a diagram illustrating minimum pixel numbers mPN corresponding to grayscale blocks GB according to an embodiment. FIG. 9 is a diagram illustrating minimum pixel numbers mPN corresponding to grayscale blocks GB according to an alternative embodiment.

Referring to FIGS. 7, 8, and 9, an embodiment of the driving voltage controller 160 may include a grayscale block generator 161, a maximum grayscale block determiner 162, a maximum grayscale determiner 163, a load calculator 164, a voltage drop amount calculator 165, and a driving voltage calculator 166.

The grayscale block generator 161 may calculate block pixel numbers BPN1-BPNn corresponding to first to $n^{th}$ grayscale blocks GB1-GBn that divides (or is defined by dividing) an entire grayscale range based on the image data IMD, and may calculate maximum grayscales MG1-MGn with respect to the first to $n^{th}$ grayscale blocks GB1-GBn based on the image data IMD. The entire grayscale range may include (or be from) 0 grayscale (or a grayscale value of 0) to 255 grayscale (or a grayscale value of 255), and 0 grayscale and 255 grayscale may correspond to black grayscale and white grayscale, respectively.

The grayscale block generator 161 may receive grayscale ranges (or range widths) GR of the first to $n^{th}$ grayscale blocks GB1-GBn. The grayscale ranges GR may be the number of grayscales included in the first to $n^{th}$ grayscale blocks GB1-GBn. In an embodiment, the grayscale ranges GR of the first to $n^{th}$ grayscale blocks GB1-GBn may be equal to each other.

In an embodiment, the first grayscale block GB1 may include 0 grayscale, and the $n^{th}$ grayscale block GBn may include 255 grayscale. In such an embodiment, the grayscales included in the first to $n^{th}$ grayscale blocks GB1-GBn may increase from the first grayscale block GB1 to the $n^{th}$ grayscale block GBn.

In an embodiment, the grayscale range (or range width) GR of each of the first to $n^{th}$ grayscale blocks GB1-GBn may be 8 grayscale values or levels. In such an embodiment, the first grayscale block GB1 may include 0 grayscale to 7 grayscale, the second grayscale block may include 8 grayscale to 15 grayscale, the $(n-1)^{th}$ grayscale block may include 240 grayscale to 247 grayscale, and the $n^{th}$ grayscale block GBn may include 248 grayscale to 255 grayscale. Further, the number of the first to $n^{th}$ grayscale blocks GB1-GBn may be 32, that is, n may be 32.

The grayscale block generator 161 may calculate the block pixel numbers BPN1-BPNn corresponding to the first to $n^{th}$ grayscale blocks GB1-GBn based on the image data IMD. The grayscale block generator 161 may divide grayscale values of the image data IMD corresponding to the pixels PX into first to $n^{th}$ grayscale blocks GB1-GBn, and may calculate the block pixel numbers BPN1-BPNn by counting the number of pixels PX corresponding to grayscales included in each of the first to $n^{th}$ grayscale blocks GB1-GBn. In a case, when the number of pixels PX having a grayscale value of 0, 2, 4, or 6 is 50,000 and the number of pixels PX having a grayscale value of 1, 3, 5, or 7 is 0, the grayscale block generator 161 may calculate the block pixel number BPN1 corresponding to the first grayscale block GB1 including 0 grayscale to 7 grayscale as 50,000. In another case, when the number of pixels PX having grayscale values of 248, 250, 252, or 254 is 0 and the number of pixels PX having grayscale values of 249, 251, 253, or 255 is 20,000, the grayscale block generator 161 may calculate the block pixel number BPNn corresponding to the $n^{th}$ grayscale block GBn including 248 grayscale to 255 grayscale as 20,000. The grayscale block generator 161 may provide the block pixel numbers BPN1-BPNn to the maximum grayscale block determiner 162.

The grayscale block generator 161 may calculate the maximum grayscales MG1-MGn with respect to the first to $n^{th}$ grayscale blocks GB1-GBn. The grayscale block generator 161 may calculate a maximum value among grayscale values of the image data IMD corresponding to each of the first to $n^{th}$ grayscale blocks GB1-GBn as the maximum grayscale MG1-MGn of each of the first to $n^{th}$ grayscale blocks GB1-GBn. In a case, when grayscale values of the image data IMD corresponding to the first grayscale block GB1 including 0 grayscale to 7 grayscale are 0, 2, 4, and 6, the grayscale block generator 161 may calculate the maximum grayscale MG1 with respect to the first grayscale block GB1 as 6 grayscales. In another case, when grayscale values of the image data IMD corresponding to the $n^{th}$ grayscale block GBn including 248 grayscale to 255 grayscale are 249, 251, 253, and 255, the grayscale block generator 161 may calculate the maximum grayscale MGn with respect to the $n^{th}$ grayscale block GBn as 255 grayscale. The grayscale block generator 161 may provide the maximum grayscales MG1-MGn to the maximum grayscale determiner 163.

The maximum grayscale block determiner 162 may determine a maximum grayscale block MGB among the first to $n^{th}$ grayscale blocks GB1-GBn by comparing the block pixel numbers BPN1-BPNn to minimum pixel numbers mPN1-mPNn corresponding to the first to $n^{th}$ grayscale blocks GB1-GBn. The maximum grayscale block determiner 162 may include a lookup table that stores the minimum pixel numbers mPN1-mPNn corresponding to the first to $n^{th}$ grayscale blocks GB1-GBn.

The maximum grayscale block determiner 162 may select target grayscale blocks, in each of which the block pixel number corresponding thereto is greater than the minimum pixel number corresponding thereto, among the first to $n^{th}$ grayscale blocks GB1-GBn. In such an embodiment, grayscale blocks, in each of which the block pixel number corresponding thereto is greater than the minimum pixel number corresponding thereto, among the first to $n^{th}$ grayscale blocks GB1-GBn may be selected as the target grayscale blocks. The maximum grayscale block determiner 162 may determine a target grayscale block including the greatest grayscale among the target grayscale blocks as the maximum grayscale block MGB.

In an embodiment, as illustrated in FIG. 8, the minimum pixel numbers mPN1-mPNn corresponding to the first to $n^{th}$ grayscale blocks GB1-GBn may be equal to each other. In such an embodiment, the maximum grayscale block determiner 162 may apply the same minimum pixel number regardless of the grayscale blocks to select the target blocks. In an embodiment, for example, when the block pixel number BPN1 corresponding to the first grayscale block GB1 is 50,000, the block pixel number BPNn corresponding to the $n^{th}$ grayscale block GBn is 20,000, and each of the minimum pixel numbers mPN1-mPNn corresponding to the first to $n^{th}$ grayscale blocks GB1-GBn is 30,000, the maximum grayscale block determiner 162 may select the first grayscale block GB1 as the target grayscale block. In this case, since there is only one target grayscale block, the maximum grayscale block determiner 162 may determine the first grayscale block GB1 as the maximum grayscale block MGB.

In an alternative embodiment, as illustrated in FIG. 9, the minimum pixel numbers mPN1-mPNn corresponding to the first to $n^{th}$ grayscale blocks GB1-GBn may decrease from the first grayscale block GB1 to the $n^{th}$ grayscale block GBn, that is, sequentially decrease from the minimum pixel number mPN1 corresponding to the first grayscale block GB1 to the minimum pixel number mPNn corresponding to the $n^{th}$ grayscale block GBn. Since the visibility of the decrease in luminance due to the decrease of the driving voltage ELVDD may increase as the grayscale increases, the maximum grayscale block determiner 162 may apply the minimum pixel number that decreases from the first grayscale block GB1 to the $n^{th}$ grayscale block GBn. In an embodiment, for example, the block pixel number BPN1 corresponding to the first grayscale block GB1 is 50,000, the block pixel number BPNn corresponding to the $n^{th}$ grayscale block GBn is 20,000, the minimum pixel number mPN1 corresponding to the first grayscale block GB1 is 40,000, and the minimum pixel number mPNn corresponding to the $n^{th}$ grayscale block GBn is 10,000, the maximum grayscale block determiner 162 may select the first grayscale block GB1 and the $n^{th}$ grayscale block GBn as the target grayscale blocks. In this case, the maximum grayscale block determiner 162 may determine the $n^{th}$ grayscale block GBn including the greatest grayscale (e.g., 255 grayscale) among the first grayscale block GB1 that includes 0 grayscale to 7 grayscale and the $n^{th}$ grayscale block GBn that includes 248 grayscale to 255 grayscale as the maximum grayscale block MGB.

The maximum grayscale determiner 163 may determine a maximum grayscale MG with respect to the maximum grayscale block MGB based on the maximum grayscales MG1-MGn. In a case, for example, when the maximum grayscale block MGB is the first grayscale block GB1 including 0 grayscale to 7 grayscale and the maximum grayscale MG1 with respect to the first grayscale block GB1 is 6 grayscale, the maximum grayscale determiner 163 may determine the maximum grayscale MG as 6 grayscale. In another case, for example, when the maximum grayscale block MGB is the $n^{th}$ grayscale block GBn including 248 grayscale to 255 grayscale and the maximum grayscale MGn with respect to the $n^{th}$ grayscale block GBn is 255 grayscale, the maximum grayscale determiner 163 may determine the maximum grayscale MG as 255 grayscale.

The load calculator 164 may calculate the load LD of the image data IMD from the image data 1 MB. The load LD of the image data IMD may be a ratio of an average grayscale value of the image data IMD to the maximum load. In an embodiment, the load LD of the image data IMD may be 0% when an image corresponding to the image data IMD is a full black image, and the load LD of the image data 1 MB may be 100% when an image corresponding to the image data IMD is a full white image.

The voltage drops amount calculator 165 may calculate the voltage drop amount VDA of the driving voltage ELVDD based on the load LD. Since the sum of the driving currents IEL flowing through the pixels PX increases as the load LD increases, the voltage drop VDA of the driving voltage ELVDD may increase as the load LD increases. The voltage drop amount calculator 165 may include a lookup table that stores the voltage drop amount VDA of the driving voltage ELVDD corresponding to the load LD.

The driving voltage calculator 166 may calculate the magnitude of the driving voltage ELVDD based on the maximum grayscale MG and the voltage drop amount VDA. The driving voltage calculator 166 may calculate the magnitude of the driving voltage ELVDD to be larger as the maximum grayscale MG or the voltage drop amount VDA increases. The driving voltage calculator 166 may calculate the magnitude of the driving voltage ELVDD based on the first to second voltage control curves VCC1, VCC2 illustrated in FIG. 3. The driving voltage calculator 166 may include a lookup table that stores the magnitude of the driving voltage ELVDD corresponding to the maximum grayscale MG and the voltage drop amount VDA. The driving voltage calculator 166 may generate the driving voltage code DVC based on the magnitude of the driving voltage ELVDD.

Figure 10:
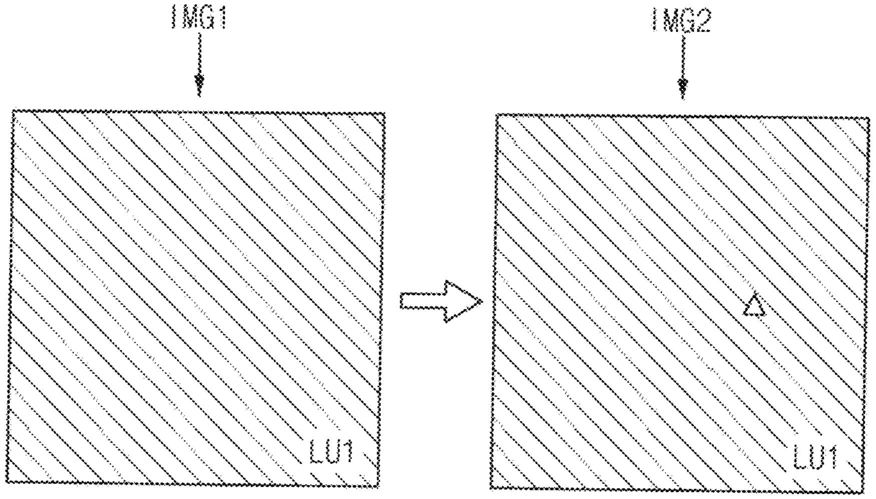
FIGS. 10, 11, and 12 are diagrams for describing a change in image according to an embodiment.
Figure 11:
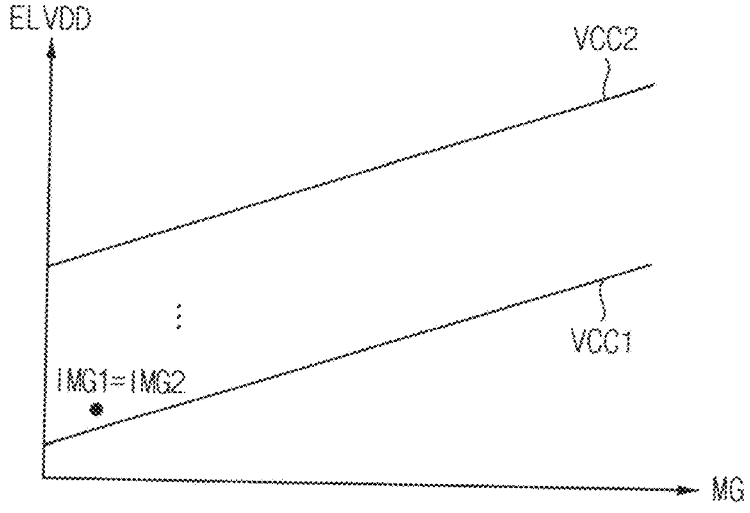
Figure 12:
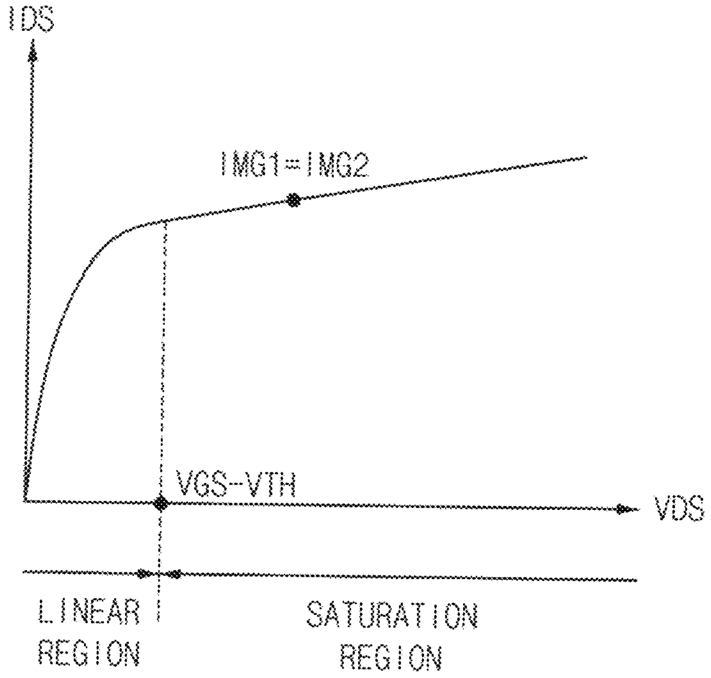

FIGS. 10, 11, and 12 are diagrams for describing a change in image according to an embodiment.

Referring to FIGS. 10, 11, and 12, in an embodiment, the driving voltage controller 160 may calculate the magnitude of the driving voltage ELVDD from the first to second voltage control curves VCC1, . . . , VCC2 based on the maximum grayscale MG with respect to the maximum grayscale block MGB and the voltage drop amount VDA. When a first image IMG1 is displayed in a first frame period and a second image IMG2 is displayed in a second frame period after the first frame period, the driving voltage controller 160 may calculate the magnitude of the driving voltage ELVDD in the first and second frame periods from the first to second voltage control curves VCC1, . . . , VCC2 based on the maximum grayscale MG corresponding to the first and second images IMG1 and IMG2 and the voltage drop amount VDA. In an embodiment, for example, the first image IMG1 may be an image in which 24,883,200 pixels PX display 30 grayscale (a dark background image), and the second image IMG2 may be an image in which 24,880,500 pixels PX display 30 grayscale and 2,700 pixels PX display 255 grayscale (an image in which a small triangle is displayed on a dark background).

The voltage drop amount VDA of the driving voltage ELVDD may be relatively small since the load of the image data IMD corresponding to the first and second images IMG1 and IMG2 is relatively small, and accordingly, the magnitude of the driving voltage ELVDD may be calculated based on a voltage control curve adjacent to the first voltage control curve VCC1 among the first to second voltage control curves VCC1, . . . , VCC2. Further, when each of the minimum pixel numbers corresponding to the first to $n^{th}$ grayscale blocks GB1-GBn is 30,000, since the maximum grayscale MG calculated based on the image data IMD corresponding to the first image IMG1 is 30 grayscale and the maximum grayscale MG calculated based on the image data IMD corresponding to the second image IMG2 is also 30 grayscale, the magnitude of the driving voltage ELVDD calculated in the second frame period displaying the second image IMG2 may be equal to the magnitude of the driving voltage ELVDD calculated in the first frame period displaying the first image IMG1. In this case, when the data signals DS provided to the pixel PX in the first and second frame periods are the same as each other, since the driving voltages ELVDD provided to the pixel PX are the same as each other, a first luminance LU1 of the background of the second image IMG2 may be substantially the same as the first luminance LU1 of the background of the first image IMG1. Accordingly, in such an embodiment, the change in background luminance due to the change in image (IMG1→IMG2) may not occur, and accordingly, image quality of the display device 100 may be improved. In such an embodiment, power consumption of the display device 100 may be reduced since the background luminance (LU1→LU1) maintains despite the change in image (IMG1→IMG2).

Figure 13:
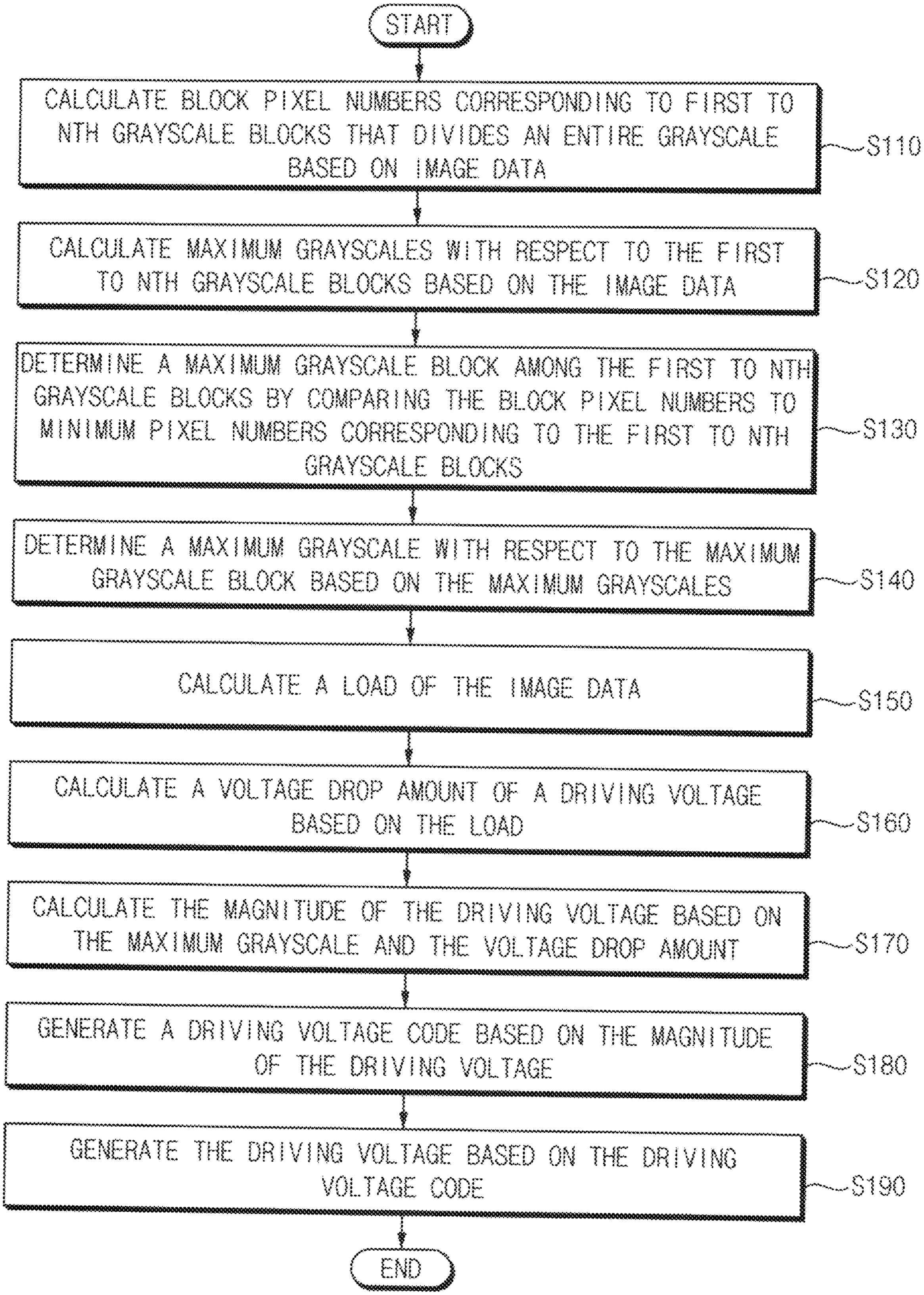
FIG. 13 is a flowchart illustrating a method of driving a display device according to an embodiment.

FIG. 13 is a flowchart illustrating a method of driving a display device according to an embodiment.

Referring to FIGS. 7 and 13, in an embodiment of the method of driving the display device, the grayscale block generator 161 may calculate the block pixel numbers BPN1-BPNn corresponding to the first to $n^{th}$ grayscale blocks GB1-GBn that divides the entire grayscale range based on the image data IMD (S110). In an embodiment, the entire grayscale range may include (or be from) 0 grayscale to 255 grayscale, the first grayscale block GB1 may include 0 grayscale, and the $n^{th}$ grayscale block GBn may include 255 grayscale. In an embodiment, the grayscale ranges (or range widths) GR of the first to $n^{th}$ grayscale blocks GB1-GBn may be equal to each other. In an embodiment, the grayscale range (or range of width) GR of each of the first to $n^{th}$ grayscale blocks GB1-GBn may be 8 grayscale values or levels. The grayscale block generator 161 may divide grayscale values of the image data IMD corresponding to the pixels PX into the first to $n^{th}$ grayscale blocks GB1-GBn, and may calculate the block pixel numbers BPN1-BPNn by counting the number of pixels PX corresponding to grayscales included in each of the first to $n^{th}$ grayscale blocks GB1-GBn.

The grayscale block generator 161 may calculate the maximum grayscales MG1-MGn with respect to the first to $n^{th}$ grayscale blocks GB1-GBn based on the image data 1 MB (S120). The grayscale block generator 161 may calculate a maximum value among grayscale values of the image data IMD corresponding to each of the first to $n^{th}$ grayscale blocks GB1-GBn as the maximum grayscale MG1-MGn of each of the first to $n^{th}$ grayscale blocks GB1-GBn.

The maximum grayscale block determiner 162 may determine the maximum grayscale block MGB among the first to $n^{th}$ grayscale blocks GB1-GBn by comparing the block pixel numbers BPN1-BPNn to minimum pixel numbers mPN1-mPNn corresponding to the first to $n^{th}$ grayscale blocks GB1-GBn (S130). The maximum grayscale block determiner 162 may select the target grayscale blocks, in each of which the block pixel number corresponding thereto is greater than the minimum pixel number corresponding thereto, among the first to $n^{th}$ grayscale blocks GB1-GBn, and may determine a target grayscale block including the greatest grayscale among the target grayscale blocks as the maximum grayscale block MGB.

In an embodiment, as illustrated in FIG. 8, the minimum pixel numbers mPN1-mPNn corresponding to the first to $n^{th}$ grayscale blocks GB1-GBn may be equal to each other. In an alternative embodiment, as illustrated in FIG. 9, the minimum pixel numbers mPN1-mPNn corresponding to the first to $n^{th}$ grayscale blocks GB1-GBn may decrease from the first grayscale block GB1 to the $n^{th}$ grayscale block GBn.

The maximum grayscale determiner 163 may determine the maximum grayscale MG with respect to the maximum grayscale block MGB based on the maximum grayscales MG1-MGn (S140).

The load calculator 164 may calculate the load LD of the image data IMD from the image data IMD (S150).

The voltage drop amount calculator 165 may calculate the voltage drop amount VDA of the driving voltage ELVDD based on the load LD (S160).

The driving voltage calculator 166 may calculate the magnitude of the driving voltage ELVDD based on the maximum grayscale MG and the voltage drop amount VDA (S170). The driving voltage calculator 166 may calculate the magnitude of the driving voltage ELVDD to be larger as the maximum grayscale MG or the voltage drop amount VDA increases.

The driving voltage calculator 166 may generate the driving voltage code DVC based on (or corresponding to) the magnitude of the driving voltage ELVDD (S180).

Referring to FIGS. 1 and 13, the driving voltage generator 150 may generate the driving voltage ELVDD based on (or corresponding to) the driving voltage code DVC (S190).

The display device according to embodiments described above may be applied to a display device included in a computer, a notebook, a mobile phone, a smart phone, a smart pad, a portable media player ("PMP"), a personal digital assistant ("PDA"), an MP3 player, or the like.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device, comprising:
- a plurality of pixels which displays an image based on image data;
- a driving voltage generator which provides a driving voltage to each of the pixels; and
- a driving voltage controller which calculates block pixel numbers corresponding to first to $n^{th}$ grayscale blocks defined by dividing an entire grayscale range based on the image data, calculates maximum grayscales with respect to the first to $n^{th}$ grayscale blocks based on the image data, determines a maximum grayscale block among the first to $n^{th}$ grayscale blocks by comparing the block pixel numbers to minimum pixel numbers corresponding to the first to $n^{th}$ grayscale blocks, determines a maximum grayscale with respect to the maximum grayscale block based on the maximum grayscales, calculates a load of the image data, calculates a voltage drop amount of the driving voltage based on the load, and calculates a magnitude of the driving voltage based on the maximum grayscale and the voltage drop amount, wherein n is a natural number greater than or equal to 2.

2. The display device of claim 1, wherein grayscale range widths of the first to $n^{th}$ grayscale blocks are equal to each other.

3. The display device of claim 1, wherein the entire grayscale range is from 0 grayscale to 255 grayscale,
- wherein the first grayscale block includes the 0 grayscale, and
- wherein the $n^{th}$ grayscale block includes the 255 grayscale.

4. The display device of claim 3, wherein a grayscale range width of each of the first to $n^{th}$ grayscale blocks is 8 grayscale levels.

5. The display device of claim 3, wherein the minimum pixel numbers corresponding to the first to $n^{th}$ grayscale blocks are equal to each other.

6. The display device of claim 3, wherein the minimum pixel numbers corresponding to the first to $n^{th}$ grayscale blocks decrease from the first grayscale block to the $n^{th}$ grayscale block.

7. The display device of claim 1, wherein the driving voltage controller calculates the magnitude of the driving voltage to be larger as the maximum grayscale or the voltage drop amount increases.

8. The display device of claim 1, wherein the driving voltage controller includes:
- a grayscale block generator which calculates the block pixel numbers corresponding to the first to $n^{th}$ grayscale blocks and the maximum grayscales with respect to the first to $n^{th}$ grayscale blocks based on the image data;
- a maximum grayscale block determiner which determines the maximum grayscale block among the first to $n^{th}$ grayscale blocks by comparing the block pixel numbers to the minimum pixel numbers corresponding to the first to $n^{th}$ grayscale blocks;
- a maximum grayscale determiner which determines the maximum grayscale with respect to the maximum grayscale block based on the maximum grayscales;
- a load calculator which calculates the load of the image data;
- a voltage drop amount calculator which calculates the voltage drop amount of the driving voltage based on the load; and
- a driving voltage calculator which calculates the magnitude of the driving voltage based on the maximum grayscale and the voltage drop amount.

9. The display device of claim 8, wherein the maximum grayscale block determiner selects target grayscale blocks, in each of which a block pixel number corresponding thereto is greater than a minimum pixel number corresponding thereto, among the first to $n^{th}$ grayscale blocks, and determines a target grayscale block including a greatest grayscale among the target grayscale blocks as the maximum grayscale block.

10. The display device of claim 1, wherein the driving voltage controller generates a driving voltage code based on the magnitude of the driving voltage, and
- wherein the driving voltage generator generates the driving voltage based on the driving voltage code.

11. The display device of claim 1, further comprising:
- a gate driver which provides a gate signal to each of the pixels; and
- a data driver which provides a data signal to each of the pixels.

12. The display device of claim 11, wherein each of the pixels includes:
- a first transistor which generates a driving current based on the driving voltage and the data signal;
- a second transistor which provides the data signal to the first transistor in response to the gate signal; and
- a light emitting element which emits light based on the driving current.

13. A method of driving a display device including a plurality of pixels which displays an image based on image data, the method comprising:
- calculating block pixel numbers corresponding to first to $n^{th}$ grayscale blocks defined by dividing an entire grayscale range based on the image data, wherein n is a natural number greater than or equal to 2;
- calculating maximum grayscales with respect to the first to $n^{th}$ grayscale blocks based on the image data;
- determining a maximum grayscale block among the first to $n^{th}$ grayscale blocks by comparing the block pixel numbers to minimum pixel numbers corresponding to the first to $n^{th}$ grayscale blocks;
- determining a maximum grayscale with respect to the maximum grayscale block based on the maximum grayscales;
- calculating a load of the image data;
- calculating a voltage drop amount of a driving voltage, which is provided to the pixels, based on the load; and
- calculating a magnitude of the driving voltage based on the maximum grayscale and the voltage drop amount.

14. The method of claim 13, wherein the determining the maximum grayscale block includes:
- selecting target grayscale blocks, in each of which a block pixel number corresponding thereto is greater than a minimum pixel number corresponding thereto, among the first to $n^{th}$ grayscale blocks; and
- determining a target grayscale block including a greatest grayscale among the target grayscale blocks as the maximum grayscale block.

15. The method of claim 13, further comprising:
- generating a driving voltage code based on the magnitude of the driving voltage; and
- generating the driving voltage based on the driving voltage code.

16. The method of claim 13, wherein grayscale range widths of the first to $n^{th}$ grayscale blocks are equal to each other.

17. The method of claim 13, wherein the entire grayscale range is from 0 grayscale to 255 grayscale,
- wherein the first grayscale block includes the 0 grayscale, and
- wherein the $n^{th}$ grayscale block includes the 255 grayscale.

18. The method of claim 17, wherein a grayscale range width of each of the first to $n^{th}$ grayscale blocks is 8 grayscale levels.

19. The method of claim 17, wherein the minimum pixel numbers corresponding to the first to $n^{th}$ grayscale blocks are equal to each other.

20. The method of claim 17, wherein the minimum pixel numbers corresponding to the first to $n^{th}$ grayscale blocks decrease from the first grayscale block to the $n^{th}$ grayscale block.

* * * * *